United States Patent
Agarwal et al.

(10) Patent No.: US 11,866,569 B1
(45) Date of Patent: Jan. 9, 2024

(54) FOAMS AND FOAM-POLYMER COMPOSITES AND FABRICATION METHODS THEREOF

(71) Applicants: Arvind Agarwal, Miami, FL (US); Kazue Orikasa, Miami, FL (US); Ambreen Nisar, Miami, FL (US); Tony Thomas, Miami, FL (US); Preyojon Dey, Miami, FL (US)

(72) Inventors: Arvind Agarwal, Miami, FL (US); Kazue Orikasa, Miami, FL (US); Ambreen Nisar, Miami, FL (US); Tony Thomas, Miami, FL (US); Preyojon Dey, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/325,188

(22) Filed: May 30, 2023

(51) Int. Cl.
  *C08K 3/30* (2006.01)
  *C08J 5/00* (2006.01)
  *C08K 3/11* (2018.01)

(52) U.S. Cl.
  CPC .............. *C08K 3/30* (2013.01); *C08J 5/005* (2013.01); *C08K 3/11* (2018.01); *C08J 2205/10* (2013.01); *C08J 2383/04* (2013.01); *C08K 2003/3009* (2013.01)

(58) Field of Classification Search
  CPC .................................................. C08J 2205/10
  See application file for complete search history.

(56) References Cited

U.S. PATENT DOCUMENTS 11,472,746 B1 * 10/2022 Agarwal ........... C04B 35/62655

FOREIGN PATENT DOCUMENTS

| CN | 105870411 A * | 8/2016 | ........ H01M 10/0525 |
| WO | WO-2015112088 A2 * | 7/2015 | .............. B01J 20/02 |

OTHER PUBLICATIONS

Ren et al (Freestanding 3D single-wall carbon nanotubes/WS2 nanosheets foams as ultra-long-life anodes for rechargeable lithium ion batteries, Electrochimica Acta 267(2018) 133-140 (Year: 2018).*
Machine translation of CN-105870411-A. (Year: 2016).*

* cited by examiner

*Primary Examiner* — Wenwen Cai
(74) *Attorney, Agent, or Firm* — Saliwanchik, Lloyd & Eisenschenk

(57) ABSTRACT

Foams and methods of fabricating and using the same are provided. The foams can be free-standing and rigid and can be used as, for example, nanofiller networks. The shape and size of the foam pore interconnected network can be tailorable/tailored. The foams can be, for example, transition metal dichalcogenide (TMD) foams with a layered structure (e.g., tungsten sulfide ($WS_2$) foams). A freeze-drying-based method can be used to fabricate bulk porous foam, which can be used for, e.g., polymer nanocomposites. A vacuum-assisted infiltration procedure can be used to fabricate a foam-polymer nanocomposite.

11 Claims, 8 Drawing Sheets

FOAMS AND FOAM-POLYMER COMPOSITES AND FABRICATION METHODS THEREOF

GOVERNMENT SUPPORT

This invention was made with government support under 80NSSC19M0201 awarded by the National Aeronautics and Space Administration. The government has certain rights in the invention.

BACKGROUND

Two-dimensional (2D) materials, such as graphene nanoplatelets (GNP), have been extensively used as effective mechanical, thermal, and electrical reinforcement in polymer matrices. However, GNP and other commonly-used 2D materials have significant limitations.

BRIEF SUMMARY

Embodiments of the subject invention provide novel and advantageous foams and methods of fabricating and using the same. The foams can be free-standing and rigid and can be used as, for example, nanofiller networks. The shape and size of the foam pore interconnected network can be tailorable/tailored. The foams can be, for example, transition metal dichalcogenide (TMD) foams with a layered structure (e.g., tungsten sulfide ($WS_2$) foams). A freeze-drying-based method can be used to fabricate bulk porous foam (e.g., $WS_2$ foam), which can be used for, e.g., polymer nanocomposites. A vacuum-assisted infiltration procedure can be used to fabricate a foam-polymer nanocomposite (e.g., $WS_2$-polymer nanocomposite).

In an embodiment, a method of fabricating a foam can comprise: preparing a slurry of slurry components, the slurry components comprising a freezing agent and particles of a first material of the foam; and freeze-drying the slurry (e.g., at a temperature in a range of from −95° C. and 30° C. (for example −90° C. for a freezing agent of acetone and 25° C. for a freezing agent of camphene; e.g., at a pressure in a range of from 0.5 Pascal (Pa) to 105 Pa, such as 1 Pa or 101.3 Pa) to give the foam comprising the first material. The foam can be rigid (i.e., not flexible) and/or free-standing. The foam can comprise a reticulated microstructure and/or lamellar regions. The first material can be a TMD (e.g., $WS_2$). The preparing of the slurry can comprise vortex mixing and/or bath sonication of the slurry components. The slurry components can further comprise a binder and/or a dispersant. The freeze-drying can comprise freezing the slurry and sublimation of at least a part of the slurry. The freezing agent can be, for example, water (e.g., deionized water), acetone, or camphene. The method can further comprise casting the slurry into a mold or any material or geometry before freeze-drying the slurry. The particles of the first material can comprise nanoparticles (e.g., nanoplatelets) of the first material.

In another embodiment, a method of fabricating a foam-polymer composite (e.g., foam-polymer nanocomposite) can comprise: forming a foam (including any or all steps/features discussed in the previous paragraph); pouring a liquid polymer on the foam within a reaction chamber, a pressure of the reaction chamber being at least 0.5 atmosphere (atm) (e.g., at least 0.8 atm, such as 1 atm or about 1 atm) during the pouring of the liquid polymer; lowering the pressure of the reaction chamber to less than 105 Pa (e.g., 101.3 Pa, or less than 10 Pa, such as 1 Pa or about 1 Pa) such that the liquid polymer matrix infiltrates the foam (and/or the foam infiltrates the matrix of the polymer) in a non-agglomerated fashion (e.g. uniformly dispersed or substantially uniformly dispersed) to give a foam-polymer mixture; and heating the foam-polymer mixture to cure the polymer and give the foam-polymer composite (e.g., heating at a temperature of at least 25° C. (for example, at least 70° C.) for at least 20 minutes). The first material can be a TMD (e.g., $WS_2$). The polymer can have a viscosity of, for example, no more than 5 Pascal-seconds (Pa-s) (e.g., no more than 3.5 Pa-s), though embodiments are not limited thereto.

In another embodiment, a foam can comprise nanoparticles (e.g., nanoplatelets) of a first material (e.g., a first material that is a TMD, such as $WS_2$). The foam can include a reticulated microstructure and/or lamellar domains. The foam can be free-standing and/or rigid. The foam can comprise at least one ice crystal. The reticulated microstructure can comprise a reticulated wall grown in a direction along a growth direction of an ice crystal of the at least one ice crystal. The reticulated microstructure can comprise a plurality of reticulated walls each respectively grown in a direction along a growth direction of an ice crystal of the at least one ice crystal.

In another embodiment, a foam-polymer composite (e.g., foam-polymer nanocomposite) can comprise: a polymer; and a foam as disclosed herein. The foam can infiltrate a matrix of the polymer (and/or the matrix of the polymer can infiltrate the foam) in a non-agglomerated fashion (e.g. uniformly dispersed or substantially uniformly dispersed). The foam-polymer composite can be non-porous. The foam-polymer composite can be, for example, a $WS_2$-polymer composite (e.g., a $WS_2$-polydimethylsiloxane (PDMS) composite).

DETAILED DESCRIPTION

Figure 1:
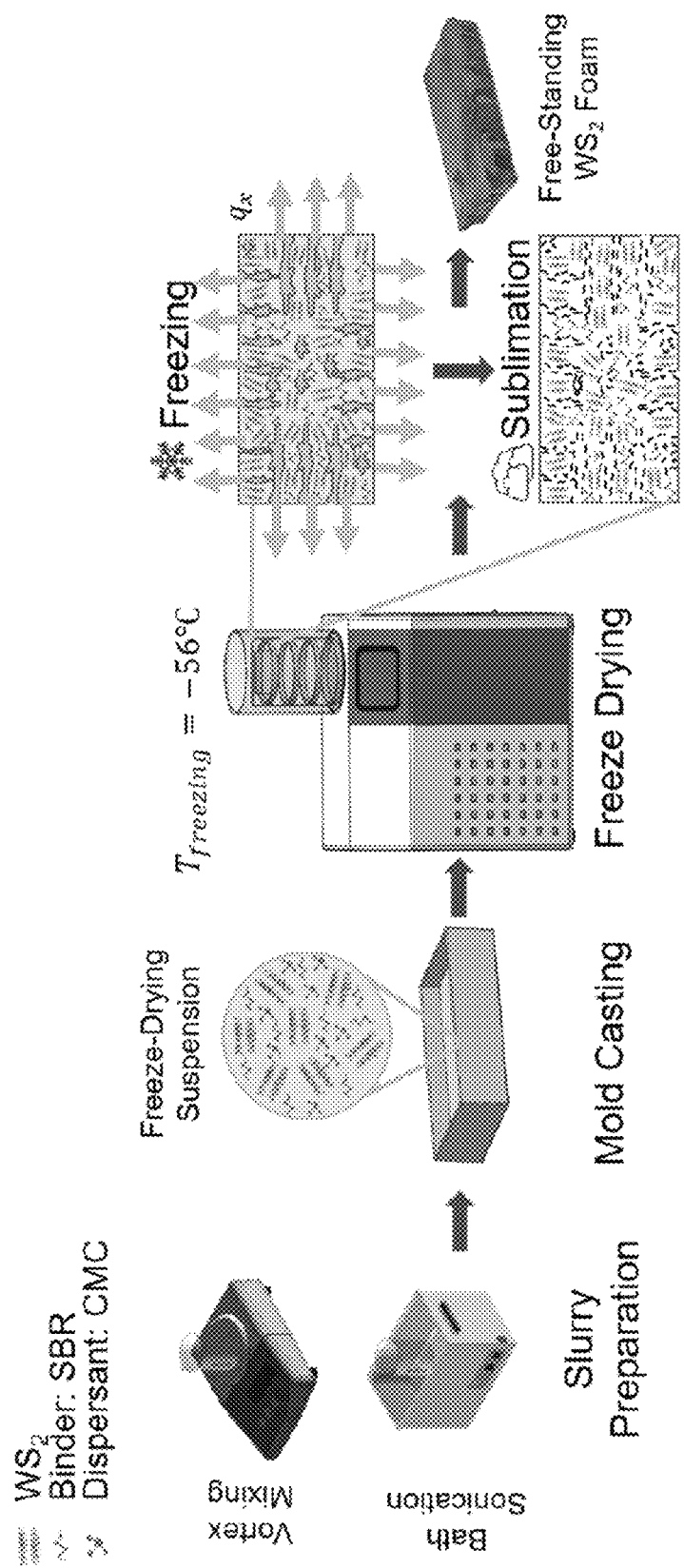
FIG. 1 shows a process flow for freeze-drying of foams (e.g., tungsten sulfide ($WS_2$) foams), including freezing and sublimation, according to an embodiment of the subject invention.

Embodiments of the subject invention provide novel and advantageous foams and methods of fabricating and using the same. The foams can be free-standing and rigid and can be used as, for example, nanofiller networks. The shape and size of the foam pore interconnected network can be tailorable/tailored. The foams can be, for example, transition metal dichalcogenide (TMD) foams with a layered structure (e.g., tungsten sulfide (WS$_2$) foams). A freeze-drying-based method can be used to fabricate bulk porous foam (e.g., WS$_2$ foam), which can be used for, e.g., polymer nanocomposites. A vacuum-assisted infiltration procedure can be used to fabricate a foam-polymer nanocomposite (e.g., WS$_2$-polymer nanocomposite). The foams can be used as, e.g., a nanofiller for polymer nanocomposites and can be used in various fields (for example, skin mountable wearables, catalysis, gas sensors, and energy storage). The insertion of a developed foam (e.g., WS$_2$ foam) into various polymer matrices opens a new window for developing advanced polymer nanocomposites with improved mechanical, thermal, and electronic properties.

WS$_2$ is a member of the TMD family that has a layered structure. WS$_2$ is known due to its excellent mechanical, tribological, thermal, optical, lubricating, and semiconducting properties. While other two-dimensional (2D) materials, such as graphene nanoplatelets (GNP), have been used as reinforcement in polymer matrices, they have significant limitations. GNP does not have a tunable bandgap and, thus, cannot be used for insulating applications. In contrast, due to its semiconducting nature, WS$_2$ overcomes this limitation (band gap ($E_g$)=1.3 electron volts (eV)) and can be applied to insulating and conducting applications. An additional advantage of WS$_2$ over GNP is its superior tribological properties in inert atmospheres and vacuum environments. WS$_2$ works as an effective lubricant in inert gases and high vacuum over a wide temperature range (e.g., from −190° C. to over 800° C.). This represents a significant advantage over GNP, which loses its low friction properties in dry environmental conditions, as it needs water molecules to promote the shearing between its layers. Due to these excellent properties, WS$_2$-polymer composites can find applications in multiple areas, such as lightweight structures, solid lubricants, sensors, capacitors, and batteries.

Achieving a uniform dispersion with conductive nanofillers in a polymer matrix has always been challenging due to the re-stacking of layers, non-uniformity in distribution, higher inter-sheet contact resistance, and van der Waals forces. The non-uniform distribution of nanofiller in a polymer matrix is often due to the high difference in the density of polymer matrix and nanofiller (such as about 0.96 grams per cubic centimeter (g/cc) for polydimethylsiloxane (PDMS) and about 7.5 g/cc for WS$_2$). These drawbacks can be obviated by consolidating 2D WS$_2$ sheets into a 3D foam structure. The three-dimensional (3D) foam architecture with a highly connected microporous structure can provide low-density behavior to a highly dense WS$_2$ (7.5 g/cc). With the unique foam processing methods of embodiments of the subject invention, it is possible to fabricate free-standing and rigid foams (e.g., WS$_2$ foams) that can be used as nanofiller networks. The fabrication methods also provide flexibility with respect to the shape and size of the foam pore interconnected network, opening the possibility of property tailoring.

FIG. 1 shows a process flow for freeze-drying of foams (e.g., WS$_2$ foams), including freezing and sublimation, according to an embodiment of the subject invention. Though FIG. 1 lists certain materials, this is for exemplary purposes only and should not be construed as limiting. Referring to FIG. 1, a slurry can be prepared and can include the primary material (e.g., nanoparticles of the primary material, such as nanoplatelets of the primary material) for the final foam (e.g., WS$_2$) and a freezing agent (e.g., water, such as deionized water) and optionally a binder (e.g., styrene-butadiene rubber (SBR)) and/or a dispersant (e.g., carboxymethyl cellulose (CMC), such as CMC sodium). The slurry preparation can include vortex mixing and/or bath/tip sonication. The prepared slurry can optionally be cast into a mold, which can include forming a freeze-drying suspension. Next, the slurry (either as a mold or as-prepared) can be freeze-dried (e.g., at a temperature below of 25° C. or below (for example, below −30° C.), such as −56° C.). The freeze-drying can include freezing the slurry (either after mold casting or as-prepared) and sublimation of parts of the slurry (e.g., as a mold). The result of the freeze-drying step is the free-standing foam comprising the primary material (e.g., WS$_2$). The foam can include a reticulated microstructure (e.g., with reticulated walls) and/or a lamellar microstructure (e.g., lamellar domains). Reticulated walls can grow along an ice crystal direction within the foam.

Figure 2:
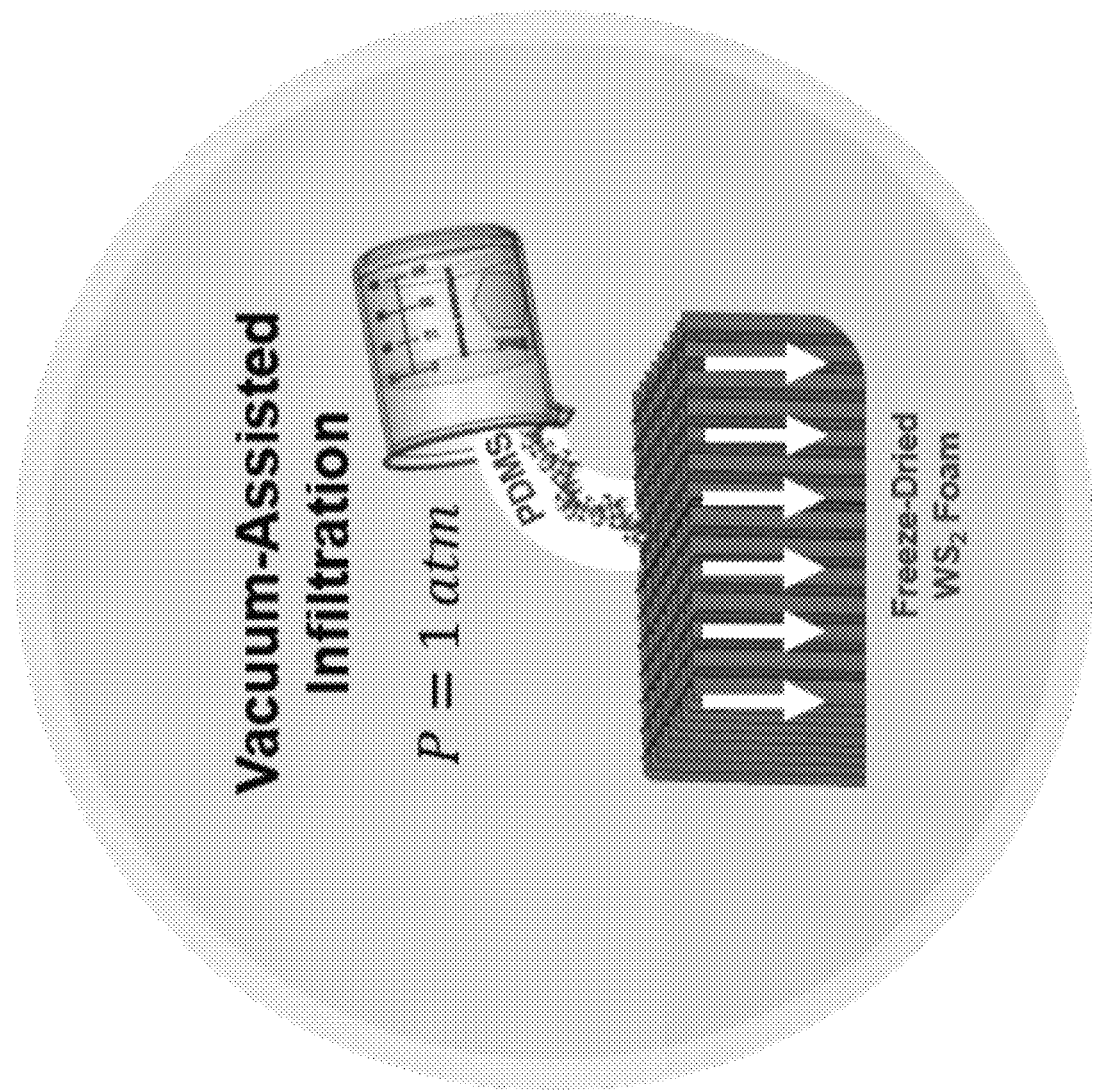
FIG. 2 shows a representation of vacuum-assisted infiltration processing of foams (e.g., polymer-$WS_2$ foams, such as polydimethylsiloxane (PDMS)-$WS_2$ foams), according to an embodiment of the subject invention.

A vacuum-assisted infiltration procedure can be used to develop a foam-polymer nanocomposite (e.g., a WS$_2$-polymer nanocomposite), as represented in FIG. 2. Though FIG. 2 lists certain materials, this is for exemplary purposes only and should not be construed as limiting. Referring to FIG. 2, a liquid polymer (e.g., PDMS) can be poured onto the free-standing foam (e.g., WS$_2$ foam) at a pressure in a range of from 0.8 atmosphere (atm) to 1.2 atm (e.g., 1 atm or about 1 atm) (temperature in a range of, for example, 20° C. to 30° C.). The pressure is then significantly lowered to be less than 1000 Pascal (Pa) (e.g., less than 100 Pa, less than 10 Pa, about 1 Pa, or 1 Pa). This results in the infiltration (e.g., total infiltration) of the foam (e.g., WS$_2$ foam) with liquid polymer to create a strong interface between the reinforcement foam and the matrix. The polymer is forced into the foam pores by pouring the liquid polymer over the foam and decreasing the pressure to a very low pressure (e.g., less than 10 Pa). The well-dispersed foam-polymer nanocomposite (e.g., WS$_2$-polymer nanocomposite) has enhanced thermal, mechanical, and electrical properties. The foam-polymer composite can be non-porous and/or fully dense. After the infiltration, the mixture can be heated (e.g., to a temperature of greater than 25° C. (for example, greater than 70° C.), such as 100° C. or about 100° C.) for a set period of time (e.g., at least 20 minutes, such as 35 minutes or about 35 minutes) to cure the polymer and give the final composite.

Figure 3A:
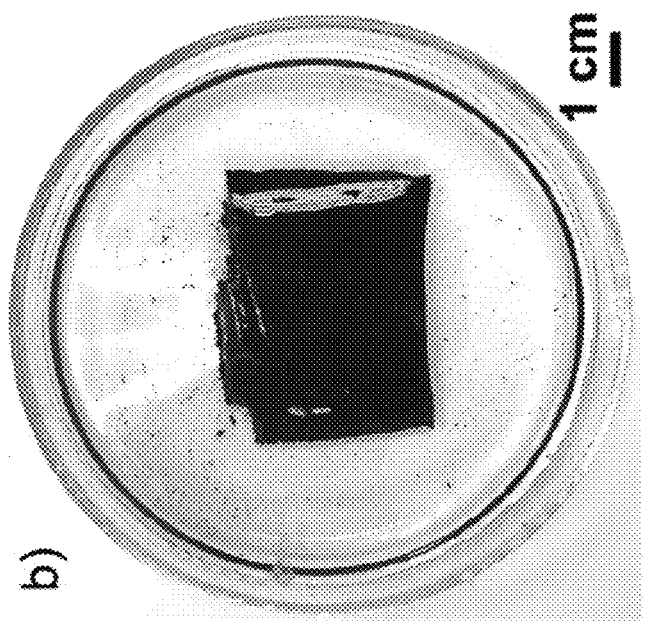
FIG. 3a shows an image of rectangular free-standing $WS_2$ foam. The scale bar is 1 centimeter (cm).
Figure 3B:
FIG. 3b shows an image of a PDMS-infiltrated $WS_2$ foam (PDMS-$WS_2$) section. The scale bar is 1 cm.
Figures 4A, 4B, 4C, 4D:
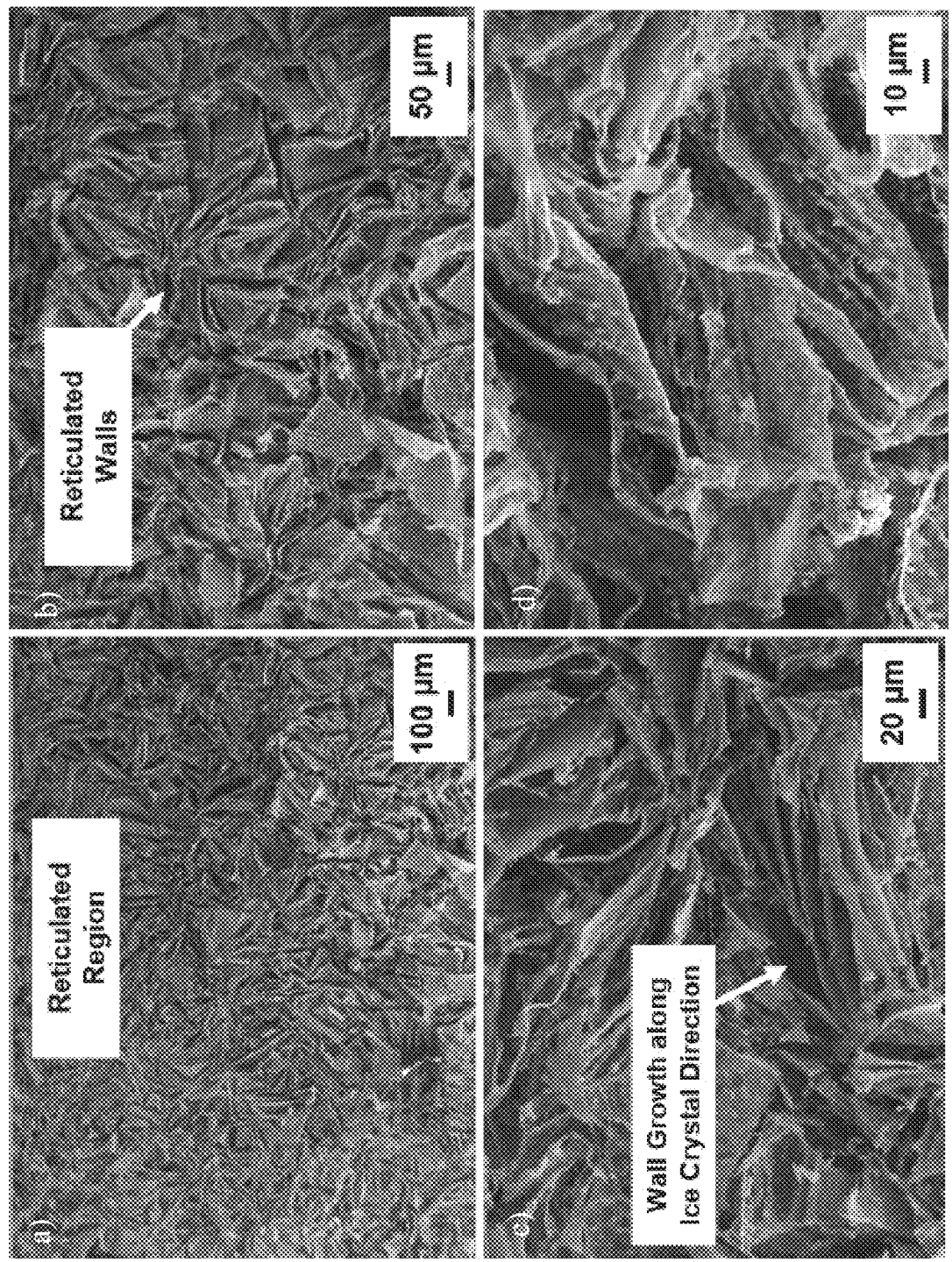
FIGS. 4a-4d show microscope images of $WS_2$ foam, showing a reticulated microstructure with foam wall growth parallel to the ice crystal direction. The scale bars are 100 micrometers (μm), 50 μm, 20 μm, and 10 μm for FIGS. 4a-4d, respectively.
Figures 5A, 5B, 5C, 5D:
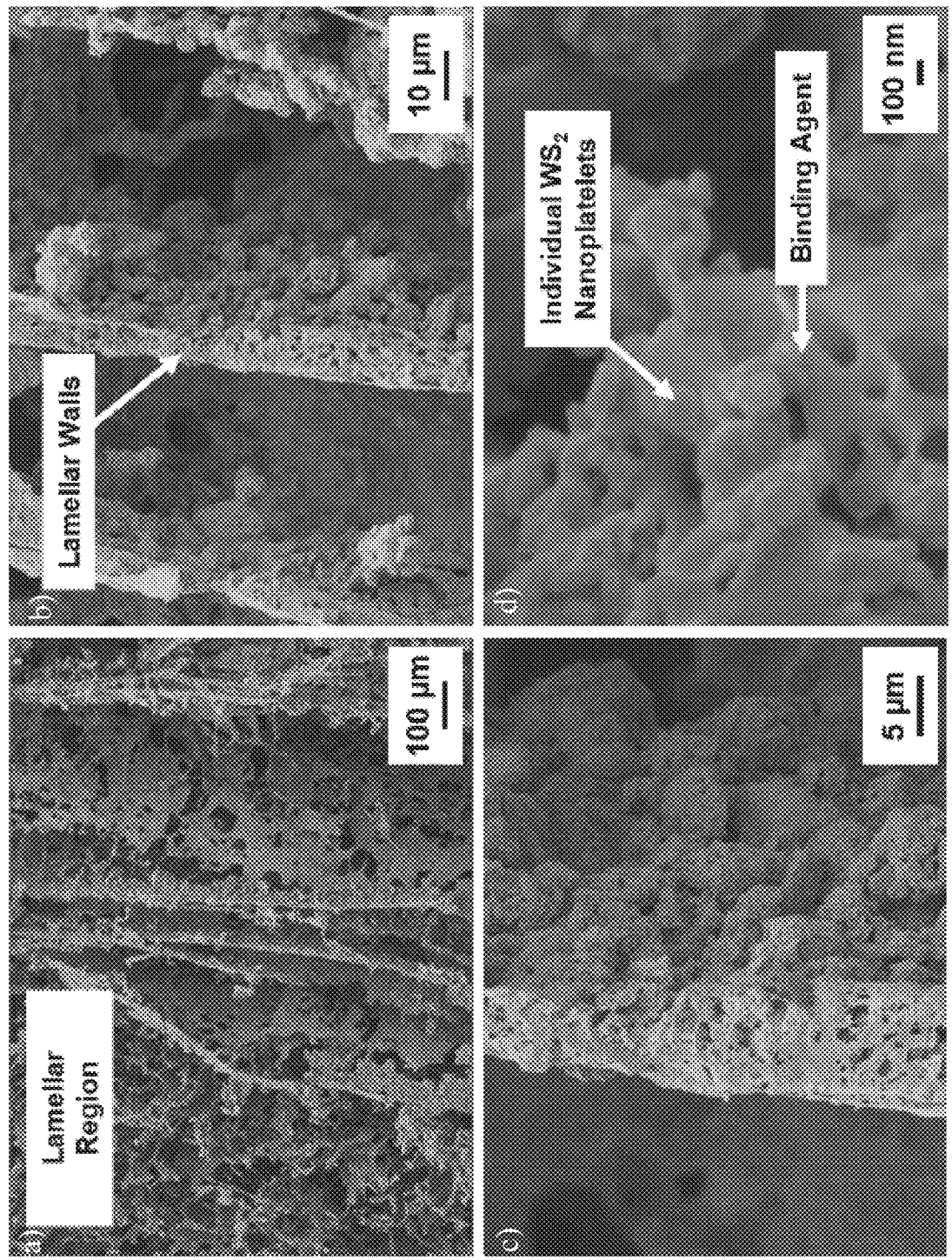
FIGS. 5a-5d show microscope images of $WS_2$ foam, showing a lamellar microstructure including individual $WS_2$ nanoplatelets bonded together. The scale bars are 100 μm, 10 μm, 5 μm, and 100 nanometers (nm) for FIGS. 5a-5d, respectively.
Figures 6A, 6B, 6C, 6D:
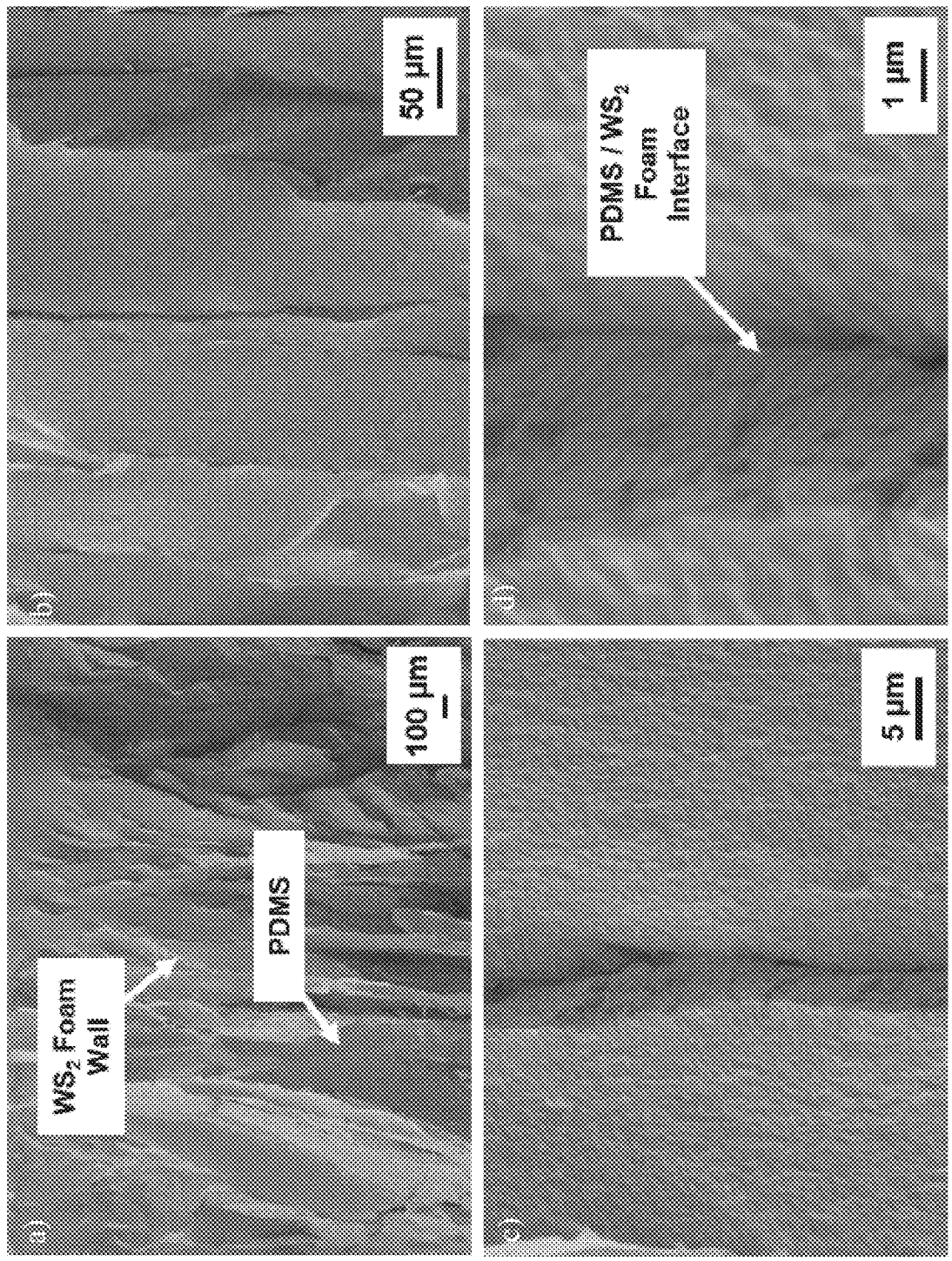
FIGS. 6a-6d show microscope images of PDMS-infiltrated $WS_2$ foam, showing a strong interface between the $WS_2$ foam and the polymer matrix. The scale bars are 100 μm, 50 μm, 5 μm, and 1 μm for FIGS. 4a-4d, respectively.

With the highly scalable methods of embodiments of the subject invention, large foams (e.g., $WS_2$ foams) and foam-polymer composites (e.g., $WS_2$-polymer composites), as seen in FIGS. 3a and 3b, can be fabricated quickly. A foam can have a width of, for example, 5 millimeters (mm), a length of, for example, at least 5 mm, and a thickness of, for example, at least 5 mm. In some embodiments, a foam can have a width of, for example, at least 4 centimeters (cm), a length of, for example, at least 4 cm, and a thickness of, for example, at least 1 cm.

In the related art, attempts at $WS_2$ reinforcement of polymer matrices is limited to mechanical shear and chemical dispersion techniques, and does not result in a structure with full infiltration of the $WS_2$ by the polymer or uniform (or even non-agglomerated) dispersion of the $WS_2$ in the matrix; nor does it result in strong interfaces between the $WS_2$ and the matrix. Mechanical shear techniques include vortex or melt mixing, ball milling, bath sonication, and tip sonication. On the other hand, chemical dispersion techniques involve acid functionalization. Due to the π-π interactions between the $WS_2$ nanoplatelets, the particles tend to agglomerate. In other words, the nanoparticle dispersion within a matrix is poor and non-uniform. This clustering limits the interfacial interaction between the filler and the polymer by preventing uniform nanomaterial distribution. Thus, relying on mechanical shear force to disperse $WS_2$ particles is not a viable technique for high-quality composites. Also, chemical dispersion approaches involve non-environmentally friendly and highly toxic acids. Hence, the related art methods are non-scalable, expensive, time-consuming, and result in non-uniform structures.

High-quality, non-agglomerated $WS_2$-polymer composites cannot be fabricated through related art methodologies. The main issue with these processing techniques is that the mechanical, thermal, and electrical properties are hindered due to nanoparticle agglomeration. These nanoparticle clusters result in stress concentration locations and severely deteriorate mechanical properties. Similarly, $WS_2$ agglomerates result in phonon and electron scattering centers, which lower the thermal and electrical conductivity of any composite. As a consequence, $WS_2$ aggregates have a negative effect on the composite performance.

Through the use of freeze-drying, embodiments of the subject invention, the $WS_2$ particle agglomeration challenges can be overcome. Freeze-drying assembles nanoparticles (e.g., $WS_2$ nanoparticles) into well-dispersed, non-agglomerated, rigid, and free-standing 3D networks or foams. Freeze-drying also allows the foam pore size, morphology, and orientation to be tailored. The foam nanoplatelets and pores can be engineered and aligned in the desired directions by manipulating thermodynamic freeze-drying processing parameters. These pore morphologies can be designed according to the application-based thermal management, mechanical stress distribution, and electrical conductivity requirements. The thermal and electrical properties of the foam can be tailored by designing phonon and electron transfer pathways across the 2D material interconnected network. Similarly, mechanical properties can be tailored by strategically distributing foam branches and connecting nodes to facilitate load transfer. The foams can then be used as the backbone of polymer composites with tailorable thermal conductivity and structural stability. The rigid free-standing foam pores can be infiltrated with highly viscous polymers to form foam-polymer (e.g., $WS_2$-polymer) composites. The high surface area of 2D materials facilitates the construction of evenly-distributed networks that enable effective phonon and mechanical stress transfer.

Though $WS_2$ is discussed extensively herein, embodiments of the subject invention are not limited thereto. Similarly, though PDMS is used as the polymer in Example 1, embodiments of the subject invention are not limited thereto. The freeze-drying slurry concentrations can be adjusted according to the desired foam microstructure. Similarly, this fabrication procedure can be applied with various materials.

Embodiments of the subject invention provide composites of higher quality than related art gold standard reinforced polymers. Embodiments allow for designing the foam microstructure to tailor the resulting composite properties. The fabrication techniques are highly scalable and versatile to form composites of multiple material systems (e.g., epoxy, polyurethane, and shape memory polymers). Further, the fabrication methods are highly affordable and enable high throughput production. $WS_2$-polymer nanocomposites can find applications in the lightweight structure, solid lubricant, sensor, capacitor, and battery fields. All of these fields can improve thermal and mechanical performance by adopting the $WS_2$-polymer composites of embodiments of the subject invention.

Embodiments of the subject invention provide rigid free-standing foams (e.g., $WS_2$ foams) as nanofiller networks for any material class (e.g., polymers, metals, and ceramics). A low-density viscous material (e.g., a polymer, such as PDMS (density of 0.96 g/cc)) can be fully infiltrated in a high density foam (e.g., $WS_2$ foam (density of 7.5 g/cc) via a vacuum-assisted infiltration process. The fabrication processes of the foams and reinforced composites are facile and scalable. Thermally conductive foams (e.g., $WS_2$ foams) improve the thermal conductivity of polymer-$WS_2$ nanocomposites up to 157% via a phonon conduction mechanism. Mechanically strong foams (e.g., $WS_2$ foams) improve the elastic modulus of polymer-$WS_2$ nanocomposites up to 156% via stress transfer through the inter-connected foam walls.

Due to the versatile nature, embodiments of the subject invention have an extremely wide range of applications. Any industry interested in the thermal, mechanical, and electrical property enhancement of materials (e.g., polymers, metals, or ceramics) can benefit, including but not limited to structural and packaging materials, solid lubricants, gas and chemical sensors, stress sensors, electromagnetic sensors, capacitors, batteries, aerospace components, automobile structures, and wearable electronic devices.

Embodiments of the subject invention provide the possibility to design the microstructure of a foam for application-centered properties. The microstructure of existing 2D material-polymer composites strongly affects the composite properties. The fabrication methods of embodiments of the subject invention are highly versatile as they can be adapted to fabricate composites of multiple material systems, while also being facile, affordable, and scalable. The fabrication methods of embodiments of the subject invention do not require organic solvents and hazardous surfactants or dispersants (and can exclude any or all of these). Instead, solid loading (e.g., $WS_2$ particles) is used, along with a freezing agent (e.g., deionized water), a binding agent, and/or a dispersing agent. Embodiments are affordable, non-toxic, and environmentally friendly.

In many embodiments, the dispersion of particles (e.g., $WS_2$ particles) can be achieved via vortex mixing and/or bath/tip sonication processes. This mixing process is controllable, facile, and can be easily scaled up from laboratory to industry. The freeze-drying of foams (e.g., WS2 foams) offers the ability to design the scaffold microstructure to tailor the composite properties. The foam structure can be designed by manipulating the process heat transfer, such as initial slurry temperature, mold material and geometry, and slurry composition. The vacuum-assisted infiltration can lead to the total infiltration of the foam (e.g., $WS_2$ foam) with liquid polymer to create a strong interface between the reinforcement (e.g. WS2) and the matrix. The polymer is forced into the foam pores by pouring the liquid polymer over the foam and decreasing the pressure (e.g., to less than 100 Pa, such as less than 10 Pa, such as 1 Pa or about 1 Pa). The infiltrated liquid polymer can be cured to give the foam-polymer composite (e.g., $WS_2$-polymer composite). The unique combination of freeze-drying and vacuum-assisted infiltration unlocks the possibility of producing lightweight, highly thermally conductive, and mechanically strong $WS_2$-polymer composites. The related art includes no fabrication methods for lightweight, thermally conductive, and mechanically strong $WS_2$ foams. Also, there are no related art fabrication routes to produce polymer-$WS_2$ foam composites with well-dispersed tailorable microstructure for thermal and mechanical property enhancement. Hence, embodiments of the subject invention provide improved nanocomposites with exciting thermal and mechanical properties, including $WS_2$-polymer composites.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/–5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

Figures 7A, 7B, 7C:
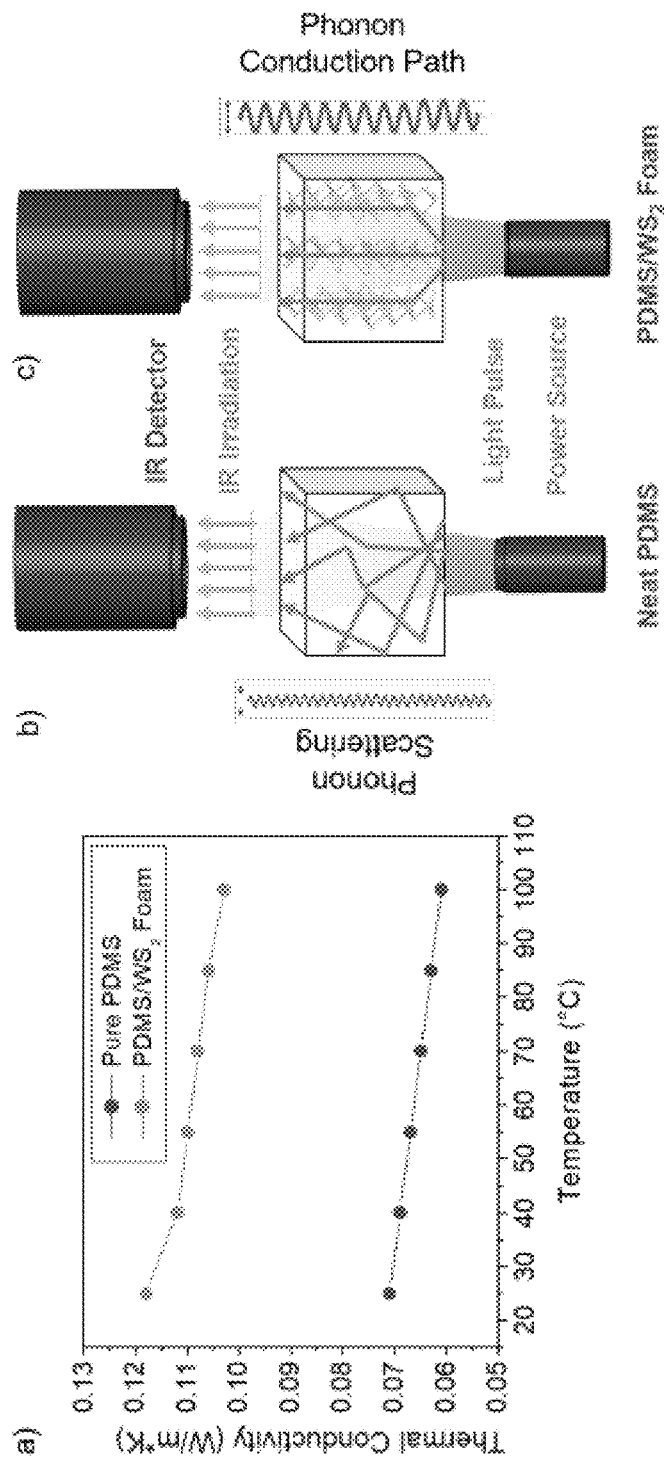
FIG. 7a shows a plot of thermal conductivity (in Watts per meter per Kelvin (W/m–K)) versus temperature (in degrees Celsius (° C.)) measured via flash diffusivity. The curve with the higher thermal conductivity values is for PDMS/WS$_2$ foam, and the curve with the lower thermal conductivity values is for pure PDMS.
FIG. 7b shows a representation of thermal conductivity of pure PDMS.
FIG. 7c shows a representation of thermal conductivity of PDMS-WS$_2$ foam.
Figures 8A, 8B, 8C:
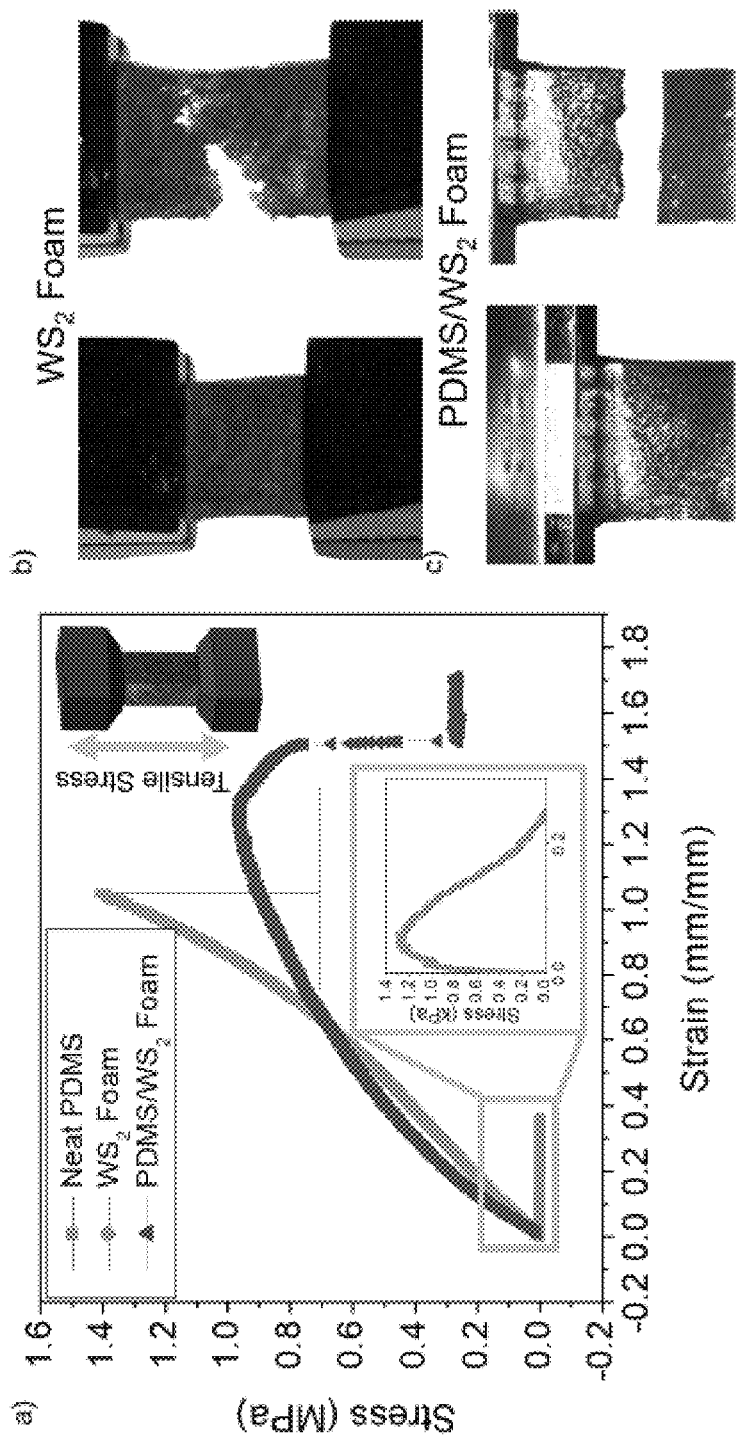
FIG. 8a shows mechanical characterization via tensile testing, showing a plot of stress (in megapascals (MPa)) versus strain (in millimeters (mm) per mm (mm/mm)). The curve with the highest stress value at a strain of 1.0 mm/mm is for neat PDMS; the curve with the second-highest stress value at a strain of 1.0 mm/mm is for PDMS/WS$_2$ foam; and the curve with the lowest stress value at a strain of 0.2 mm/mm is for WS$_2$ foam. The inset plot shows more detail on the WS$_2$ foam curve. The image in the top-right corner of the plot shows the direction of the tensile stress.
FIG. 8b shows an image of WS$_2$ foam before (left side of figure) and after (right side of figure) failure during the tensile testing.
FIG. 8c shows an image of PDMS-WS$_2$ foam before (left side of figure) and after (right side of figure) failure during the tensile testing.

PDMS-$WS_2$ composites were fabricated. A $WS_2$ foam was fabricated via freeze-drying with a slurry of the following composition: 94.5 wt. % deionized water (freezing agent), 4 wt. % $WS_2$ nanoplatelets (solid loading), 1 wt. % SBR (binding agent), and 0.5 wt. % CMC (dispersing agent). The resulting $WS_2$ foam presented a reticulated structure, as seen in FIGS. 4a-4d with lamellar domains, as seen in FIGS. 5a-5d. FIG. 3a presents an image of the foam. The freeze-dried $WS_2$ foam (3.5 vol %) was then infiltrated with liquid PDMS (96.5 vol %). Liquid PDMS was poured on top of the $WS_2$ foam, and the mixture was subjected to low-pressure conditions of 1 Pa. Subsequently, the liquid PDMS-$WS_2$ foam mixture was heated to 100° C. for 35 minutes to cure the PDMS and fully finalize the composite production. FIG. 3b shows an image of the composite. Referring to FIGS. 6a-6d, the polymer fully infiltrated the $WS_2$ foam pores resulting in a fully dense and non-porous composite. FIGS. 7a-7c show thermal conductivity of pure PDMS and the PDMS-$WS_2$ composite, measured via flash diffusivity. The composite had much higher thermal conductivity than pure PDMS. FIGS. 8a-8c show mechanical characterization results of the $WS_2$ foam and the PDMS-$WS_2$ composite, measured via tensile testing. The PDMS-$WS_2$ composite had much better mechanical properties than $WS_2$ foam.

It can be concluded that the presented technique can be applied at least with liquid polymers of similar or lower viscosity than PDMS (3.5 pascal seconds (Pa-s)). That is, embodiments of the subject invention can include use of polymers with a viscosity of 5 Pa-s or less (and possibly polymers with a higher viscosity, though one or more additional processing steps might be needed for infiltration; applying heat to highly viscous polymers may be required to decrease their viscosity and easily flow into the foam pores).

It is noted that the microstructure of the $WS_2$ foam included highly hierarchical interconnected walls and branches produced during freeze-drying. The microstructure presented two domains—reticulated and lamellar. The porosity of the $WS_2$ foam was 96.5%. The microstructure of the PDMS-infiltrated $WS_2$ foam demonstrated full polymer infiltration into the reinforcement network. No pores were present in the final PDMS-$WS_2$ composite.

The experimental thermal conductivities measured via flash diffusivity of neat PDMS and PDMS/$WS_2$ foam yielded $$\kappa_{PDMS} = 0.07 \pm 0.01 \frac{W}{m \cdot K} \text{ and } \kappa_{PDMS/WS_2} = 0.11 \pm 0.01 \frac{W}{m \cdot K},$$

respectively (FIGS. 7a-7c). The thermal conductivity of PDMS/$WS_2$ Foam was 157% higher than that of pure PDMS. This thermal conductivity enhancement can be explained by the fact that the $WS_2$ foam walls provide an uninterrupted pathway for phonon conduction. On the other hand, in neat PDMS, no phonon pathways enable heat transfer. Instead, the phonons are scattered along the polymer chains (see FIGS. 7b and 7c).

The macro-scale tensile tests of the composites demonstrated that the Young's Modulus of PDMS/$WS_2$ foam was 156.14% higher than that of pure PDMS, $E_{PDMS}$=1.14±0.2 MPa, while $E_{PDMS/WS_2}$=1.78±0.4 MPa (FIGS. 8a-8c). This mechanical property enhancement is attributed to the fact that the interconnected $WS_2$ network provides a continuous pathway that enables mechanical stress transfer between the foam walls. In contrast, neat PDMS singularly relies on the polymer chain strength.

The $WS_2$ foam and PDMS-$WS_2$ composite were designed for mechanical and thermal property enhancement. Augmentation of 1.57 times the thermal conductivity of PDMS with adding 3.5 vol. % of $WS_2$ foam was obtained. In addition, the integration of 3.5 vol. % of $WS_2$ foam into PDMS led to the mechanical integrity of 1.56 times higher than that of the neat polymer.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating a foam, the method comprising:
preparing a slurry of slurry components, the slurry components comprising a freezing agent, a binding agent, a dispersing agent, and particles of a first material of the foam; and
freeze-drying the slurry at a temperature in a range of from −60° C. to 0° C. to give the foam comprising the first material,
the foam being free-standing,
the foam comprising a reticulated microstructure,
the first material being a transition metal dichalcogenide (TMD), and
the binding agent comprising styrene-butadiene rubber (SBR) and the dispersing agent comprising carboxymethyl cellulose (CMC).

2. The method according to claim 1, the first material being tungsten sulfide ($WS_2$).

3. The method according to claim 1, the preparing of the slurry comprising vortex mixing and bath sonication of the slurry components.

4. The method according to claim 1, the temperature of the freeze-drying of the slurry being in a range of from −60° C. to −30° C.

5. The method according to claim 1, the foam comprising lamellar domains.

6. The method according to claim 1, the freezing agent being deionized water.

7. The method according to claim 1, the particles of the first material comprising nanoparticles of the first material.

8. A method of fabricating a foam-polymer composite, the method comprising:
performing the method according to claim 1 to form a foam;
pouring a liquid polymer on the foam within a reaction chamber, a pressure of the reaction chamber being at least 0.5 atmosphere (atm) during the pouring of the liquid polymer;
lowering the pressure of the reaction chamber to less than 100 Pascal (Pa) such that a matrix of the liquid polymer infiltrates the foam in a non-agglomerated fashion to give a foam-polymer mixture; and
heating the foam-polymer mixture to cure the polymer and give the foam-polymer composite.

9. The method according to claim 8, the first material being tungsten sulfide ($WS_2$).

10. A method of fabricating a foam, the method comprising:
preparing a slurry of slurry components, the slurry components comprising a freezing agent, a binder, a dispersant, and particles of a first material of the foam;
casting the slurry into a mold to give a shaped slurry; and
freeze-drying the shaped slurry at a temperature in a range of from −60° C. to −30° C. to give the foam comprising the first material,
the foam being free-standing,
the foam comprising a reticulated microstructure and lamellar domains,
the first material being tungsten sulfide ($WS_2$),
the preparing of the slurry comprising vortex mixing and bath sonication of the slurry components,
the freeze-drying comprising freezing the shaped slurry and sublimation of at least a part of the freezing agent,
the freezing agent being deionized water,
the particles of the first material comprising nanoplatelets of the first material, and
the binding agent comprising styrene-butadiene rubber (SBR) and the dispersing agent comprising carboxymethyl cellulose (CMC).

11. A method of fabricating a foam-polymer nanocomposite, the method comprising:
performing the method according to claim 10 to form a foam;
pouring a liquid polymer on the foam within a reaction chamber, a pressure of the reaction chamber being at least 0.5 atmosphere (atm) during the pouring of the liquid polymer;
lowering the pressure of the reaction chamber to less than 10 Pascal (Pa) such that the foam infiltrates a matrix of the liquid polymer in a non-agglomerated fashion to give a foam-polymer mixture; and
heating the foam-polymer mixture to cure the polymer and give the foam-polymer composite,
the polymer having a viscosity of no more than 5 Pascal-seconds (Pa-s).

* * * * *